United States Patent [19]

Tsurufuji et al.

[11] Patent Number: 4,903,291
[45] Date of Patent: Feb. 20, 1990

[54] AUTOMATIC ON-HOOK ARRANGEMENT

[75] Inventors: Shinichi Tsurufuji, Nara; Masayuki Iida, Yawata, both of Japan

[73] Assignee: Sanyo Electric Co., Ltd., Japan

[21] Appl. No.: 106,228

[22] Filed: Oct. 6, 1987

[30] Foreign Application Priority Data

Oct. 9, 1986 [JP] Japan .................................. 61-155027

[51] Int. Cl.$^4$ ............................................. H04M 1/27
[52] U.S. Cl. ...................................... 379/88; 379/190; 379/355; 379/389
[58] Field of Search ....................... 379/80, 69, 33, 32, 379/67, 190, 388, 88, 355, 389

[56] References Cited

U.S. PATENT DOCUMENTS 3,864,520  2/1975  Owen .................................. 379/80 X

FOREIGN PATENT DOCUMENTS

| 0039154 | 3/1984 | Japan .................................. 379/388 |
| 59-225656 | 12/1984 | Japan . |
| 0030850 | 2/1986 | Japan·.................................. 379/388 |
| 61-144157 | 7/1986 | Japan . |
| 61-167251 | 7/1986 | Japan . |
| 62-39947 | 2/1987 | Japan . |
| 62-105561 | 5/1987 | Japan . |
| 853024 | 11/1960 | United Kingdom .................. 379/80 |

*Primary Examiner*—Thomas W. Brown
*Attorney, Agent, or Firm*—Darby & Darby

[57] ABSTRACT

An automatic on-hook arrangement which includes a voice detecting circuit for detecting input voice from a micro-phone, a timer for measuring time in which the input voice from the micro-phone is not detected, a warning section which emits warning upon measurement of a predetermined time by the timer, a warning releasing switch for releasing the warning, a telephone line control circuit for cutting off a telephone line, and a control section connected to each of the above components. The warning section emits the warning when the input voice is not detected for the predetermined time by the voice detecting circuit, and the telephone line control circuit cuts off the telephone line when the warning is not released, and further, the input voice is not detected for another predetermined time.

13 Claims, 3 Drawing Sheets

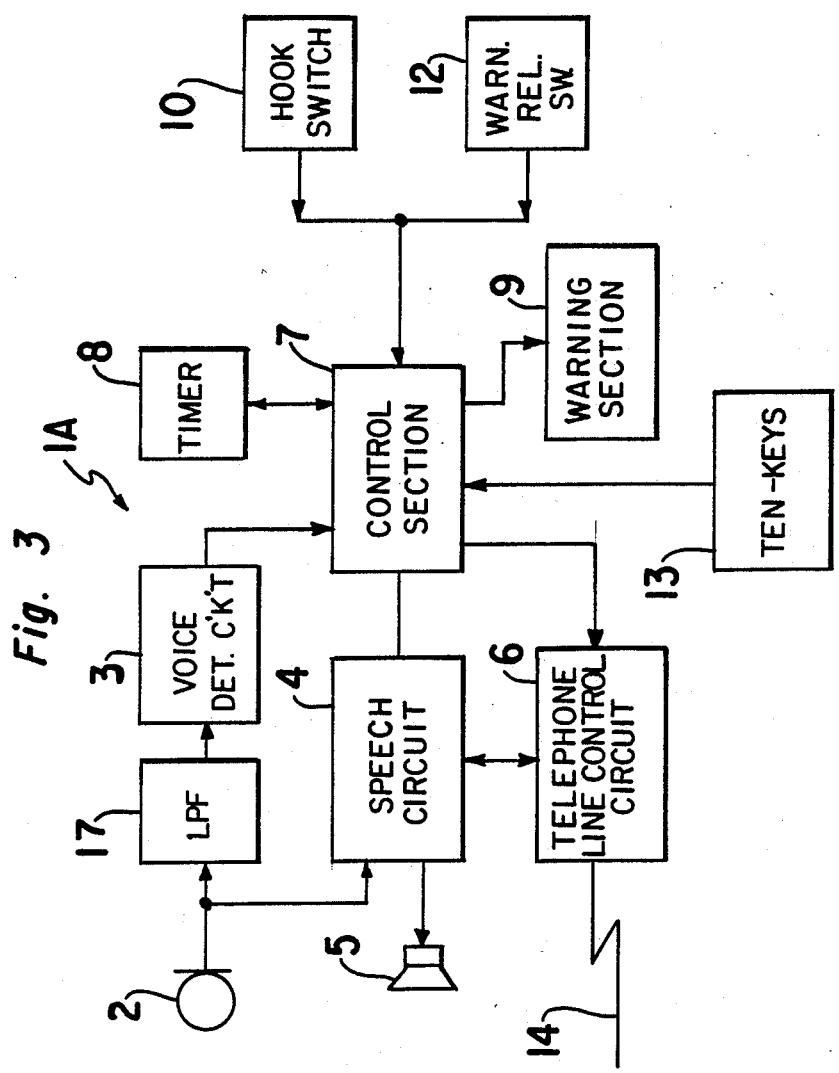

AUTOMATIC ON-HOOK ARRANGEMENT

BACKGROUND OF THE INVENTION

The present invention generally relates to a communication equipment and more particularly, to an automatic on-hook arrangement for a telephone set having a speaker-phone function, without requiring a handset.

Conventionally, in the telephone set of the kind as referred to above, it has been a common practice to establish an off-hook state for communication and an on-hook state for termination of communication through depression of a push button switch, and there are cases where the pushbutton switch remains undepressed carelessly even after termination of the communication, thus resulting in that the telephone set is undesirably left in the off-hook state for communication. Particularly, in the case of a speech recognition telephone, there may be a case where the state for communication is not terminated even when it is intended to complete the communication by uttering a voice for instructing the termination of the communication, e.g. "on-hook", and thus, the telephone set tends to be left in the off-hook state for communication. In this case, if the person at the other end of the line hooks on the telephone set, a warning sound is transmitted from the telephone exchange to the telephone set in the off-hook state for communication, and thus, such telephone set is never left in the off-hook state. However, in the case where the other party is not a person, but a machine as in a weather forecast or correction-time indication, the telephone set at the other party remains in the off-hook state, and thus, the telephone sets at the both ends are left in the off-hook state. Moreover, there has also been such a problem as wrong dialing due to an erroneous recognition arising from noise inputs, etc.

SUMMARY OF THE INVENTION

Accordingly, an essential object of the present invention is to provide an automatic on-hook arrangement for a telephone set, which is adapted to eliminate the problem that the telephone set is left in the off-hook state carelessly, without on-hook thereof after completion of communication or to prevent wrong dialing due to the erroneous recognition by noise inputs and the like.

Another object of the present invention is to provide an automatic on-hook arrangement of the above described type, which is simple in construction and accurate in functioning, and can be readily incorporated into the telephone system of said kind at low cost.

In accomplishing these and other objects, according to one preferred embodiment of the present invention, there is provided an automatic on-hook arrangement which includes a voice detecting circuit for detecting input voice from a micro-phone, a timer for measuring time in which the input voice from the micro-phone is not detected, a warning section which emits warning upon measurement of a predetermined time by the timer, a warning releasing switch for releasing the warning, a telephone line control circuit for cutting off a telephone line, and a control section connected to each of the above components and is characterized in that, the warning section emits the warning when the input voice is not detected for the predetermined time by the voice detecting circuit, and the telephone line control circuit cuts off the telephone line when the warning is not released, and further the input voice is not detected for the predetermined time.

By the construction according to the present invention as described above, since it is detected by the voice detecting circuit and the timer that the voice is not inputted from the micro-phone for the predetermined time, when the telephone set is left in the off-hook state for communication, the telephone line may be cut off by the telephone line control circuit after emitting the warning from the warning section.

BRIEF DESCRIPTION OF THE DRAWINGS

These and other objects and features of the present invention will become apparent from the following description taken in conjunction with the preferred embodiment thereof with reference to the accompanying drawings, in which;

FIG. 3 is a block diagram of the automatic on-hook arrangement of FIG. 1, but which also has a low pass filter.

DETAILED DESCRIPTION OF THE INVENTION

Figure 1:
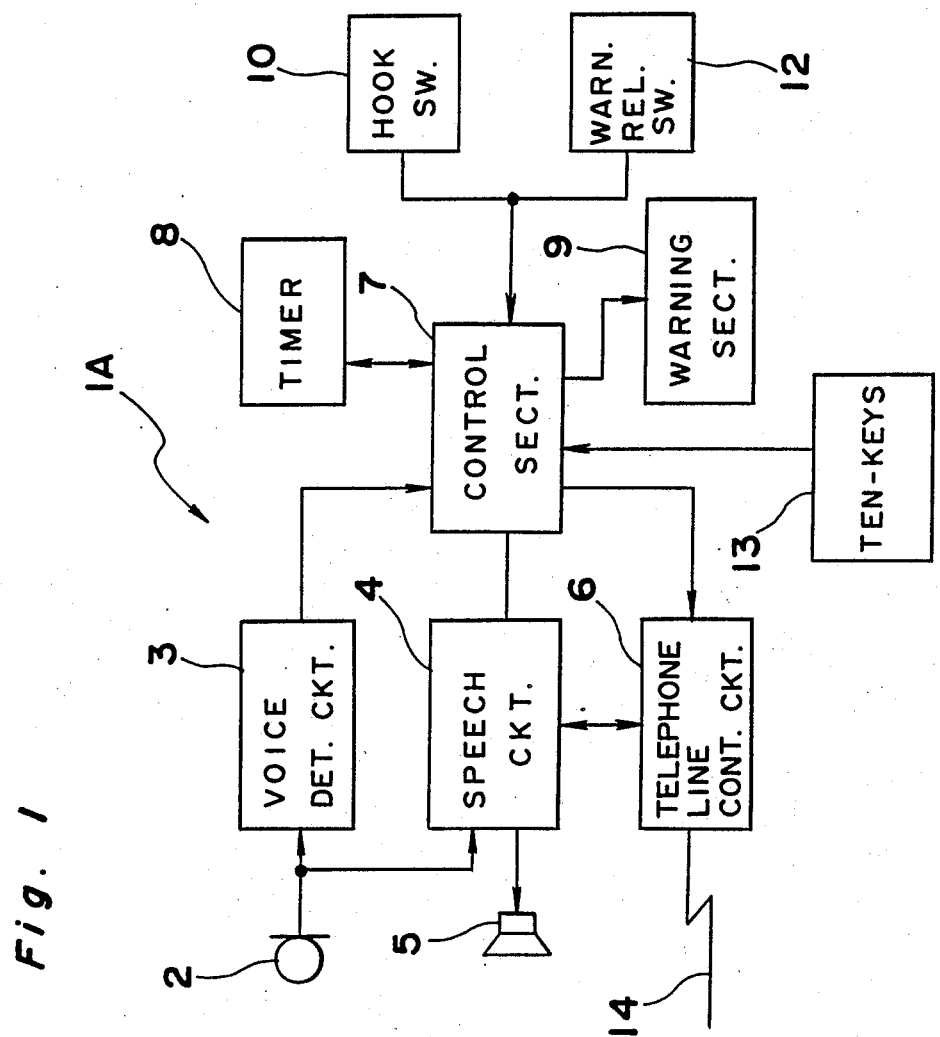
FIG. 1 is a block diagram showing a general construction of an automatic on-hook arrangement according to one preferred embodiment of the present invention.

Before the description of the present invention proceeds, it is to be noted that like parts are designated by like reference numerals throughout the accompanying drawings.

Referring now to the drawings, there is shown in FIG. 1 a block diagram representing a general construction of an automatic on-hook arrangement according to one preferred embodiment of the present invention. In FIG. 1, a micro-phone 2 of a speech recognition telephone set 1A is connected to a voice detecting circuit 3 and a speech circuit 4, which is further connected to a speaker 5, a telephone line control circuit 6 and a control section 7 for controlling the telephone line control circuit 6. To the control section 7 also coupled with the voice detecting circuit 3, there are further connected a timer 8, a warning section 9, a hook switch 10, a warning releasing switch 12, and ten-keys 13, with a telephone line 14 being connected to the telephone line control circuit 6 as illustrated.

Subsequently, functioning of the on-hook arrangement of the present invention as described above will be explained hereinbelow.

In the first place, upon depression of the hook switch 10 by an operator, the control section 7 gives an instruction for off-hook to the telephone line control circuit 6. Based on this instruction, the telephone line control circuit 6 connects the telephone line 14, and after confirming that the telephone line 14 has been connected, the operator inputs a telephone number of the other party by the ten-keys 13 for transmission to the telephone line 14. Thus, conversation is started with the other party through the micro-phone 2 and the speaker 5. In this case, the speech circuit 4 effects the control of the voice or audio signals from the micro-phone 2 and the telephone line 14. The voice detecting circuit 3 detects the voice inputted from the micro-phone 2 at all times so as to transmit the detection signal to the control section 7, which applies a reset signal to the timer 8 based on this detection signal for resetting of the timer 8. This timer 8 counts up when the reset signal is not sent out, and the control section 7 feeds a notification signal to the warning section 9 when the timer 8 reaches a predetermined value (e.g. three minutes).

Based on the above signal, the warning section 9 emits a warning sound or voice instructing "on-hook" to the operator for warning to effect the on-hook. In the case where the operator wishes to further continue the conversation after receiving the above warning, he either depresses the warning releasing switch 12 or emits some voice toward the micro-phone 2. Upon depression of the warning releasing switch 12, the releasing signal is applied to the control section 7, which in turn, feeds the reset signal to the timer 8. Meanwhile, when some voice is emitted toward the micro-phone 2, the control section 7 applies the reset signal to the timer 8 based on the detection signal of the voice detecting circuit 3 as described earlier.

Hereinbelow, there will be described the functioning for cutting off the telephone line 14 after the warning.

After feeding the notification signal to the warning section 9, the control section 7 resets the timer 8. When the timer 8 after the resetting is again counted up to be the predetermined value (e.g. one minute), the control section 7 transmits the on-hook instruction to the telephone line control circuit 6 only when the warning releasing switch 12 is not operated and the voice detecting circuit 3 does not effect the voice detection, and thus, the telephone line control circuit 6 cuts off the telephone line 14.

Figure 2:
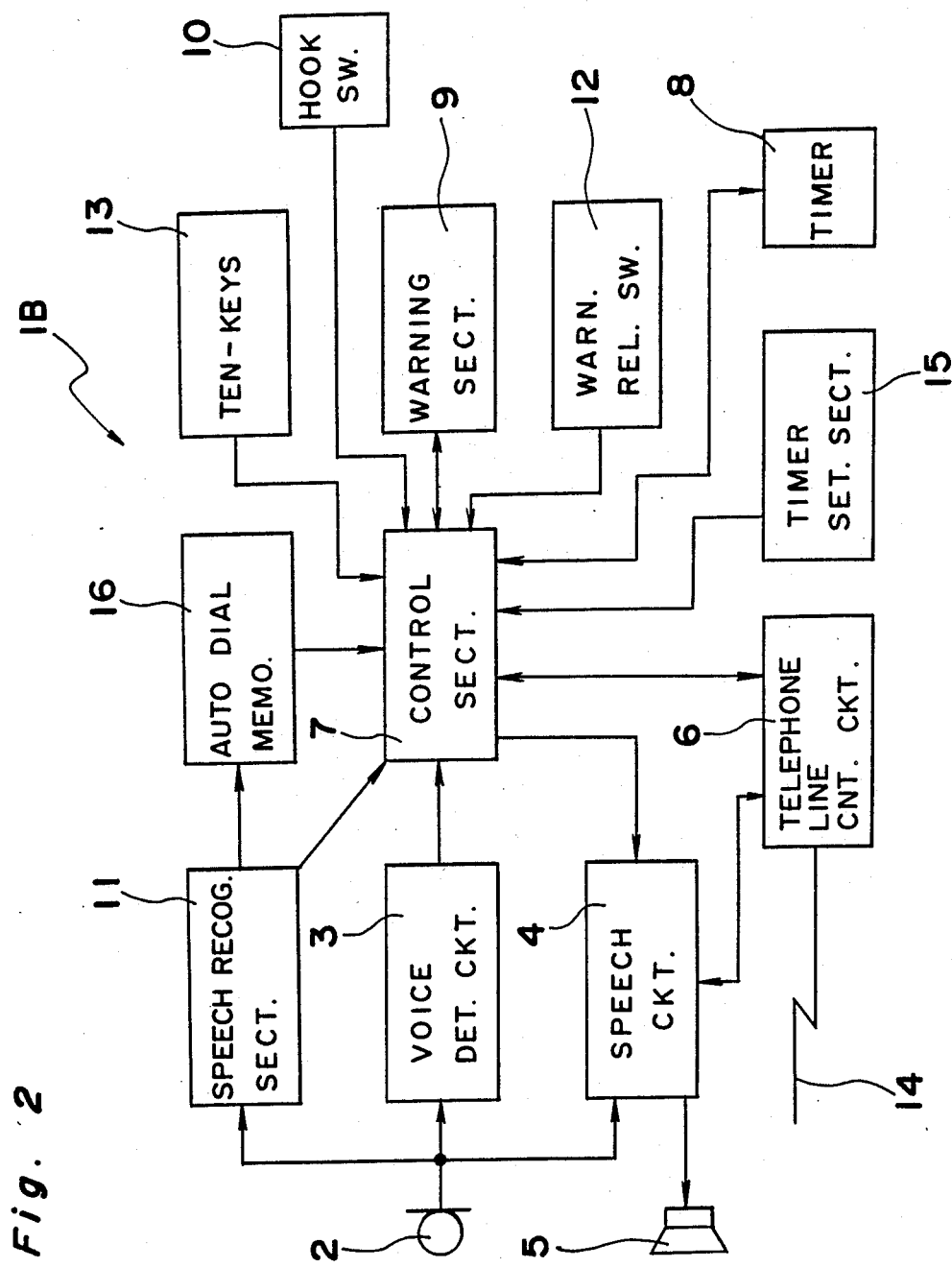
FIG. 2 is a block diagram similar to FIG. 1, but which shows an automatic on-hook arrangement according to a second embodiment of the present invention.

Referring further to FIG. 2, there is shown a block diagram of a speech recognition telephone system representing an automatic on-hook arrangement according to a second embodiment of the present invention.

In FIG. 2 the micro-phone 2 of the speech recognition telephone 1B is connected to the voice detecting circuit 3, speech circuit 4 and a speech recognition section 11, and said speech recognition section 11 is connected to an auto-dial memory 16 while the speech circuit 4 is coupled to the speaker 5, the telephone line control circuit 6 connected to the telephone line 14, and the control section 7 for controlling said circuit 6. Said control section 7 is further connected to the timer 8, warning section 9, hook switch 10 and warning releasing switch 12, and also to a timer setting section 15 and the ten-keys 13.

Subsequently, the practice for preliminarily registering the speech pattern, telephone number for the autodial, timer set time, and count starting time for the timer in the speech recognition telephone will be described hereinafter.

After setting up a register mode by a registering switch (not shown), the operator inputs a control command e.g. "denwa" (which means "telephone") for off-hook of the telephone line into the speech recognition section 11 through the micro-phone 2. The speech recognition section 11 analyses the input voice and forms a speech pattern for storing in a reference pattern memory (not shown) within the speech recognition section 11. Then, in the similar manner, a control command e.g. "on-hook" or "owari" for on-hook of the telephone line, a cancel command "cancel" for cancelling the result of the speech recognition, and another command "OK" for ensuring the result of the speech recognition are inputted.

Subsequently, the operator registers the number for the auto-dial in the auto-dial memory 16. In the first place, the operator utters the name of the other party into the micro-phone 2 (e.g. "Sanyo"). The voice thus uttered is stored in the auto-dial memory 16 after being formed into a speech pattern by the speech recognition section 11. Thereafter, the telephone number for the auto-dial is registered by the ten-keys (e.g. as 411161). Then, the timer setting time (time up to the on-hook) and the count starting time of the timer are inputted by the timer setting section 15 (e.g. for one minute from the telephone number sending out time). The speech pattern, telephone number, timer setting time and count starting time of the timer are stored as one set in the auto-dial memory 16. Other auto-dial numbers are also stored in the auto-dial memory 16 in the similar manner.

Hereinbelow, actual use of the arrangement of FIG. 2 will be described.

In the first place, the operator sets the recognition mode by the recognition mode switch (not shown), and then, utters the voice "denwa" toward the micro-phone 2. The speech recognition section 11 effects the speech recognition processing based on the input voice and the preliminarily registered speech pattern, and outputs the result of recognition to the control section 7. If the result of recognition from the speech recognition section 11 is of "denwa", the control section 7 transmits said recognition result to the telephone line control circuit 6, which connects the telephone line 14 by receiving the instruction from the control section 7. Subsequently, the operator utters the voice for the name of the other party (e.g. "Sanyo") toward the micro-phone 2.

The speech recognition section 11 analyses the input voice to effect the speech recognition processing based on the speech pattern in the auto-dial memory 16 preliminarily registered, and applies the result of recognition to the control section 7. The control section 7 calls out the telephone number, timer setting time and count starting time of the timer corresponding to the result of the recognition from the auto-dial memory 16, and displays the result of recognition on a display section (not shown). In the case where the result of recognition is correct, the operator utters the voice "OK" toward the micro-phone 2. (if the result of recognition is not correct, the operator utters the voice for the other party again). The speech recognition section 11 transmits the result of speech recognition to the control section 7. In the case where the result of recognition is of "OK", the control section 7 transmits the telephone number already called out, to the telephone line control circuit 6, and the timer setting time, to the timer 8, while giving instruction for the detection of voice to the voice detection circuit 3. The telephone line control circuit 6 successively sends out the set telephone number to the telephone line 14. The timer 8 counts the time, and upon arrival at the set time, transmits the time-over to the control section 7. The control section 7 instructs cutting off of the telephone line 14 to the telephone line control circuit 6 by the signal indicating the time-over from the timer 8.

Although the timer setting time and the count starting time of the timer may be suitably set according to the other party therefor, if the count starting time for the timer is set to be at the time point when the telephone number is forwarded to the telephone line, there will be eliminated such an inconvenience that the dialing is effected by an erroneous recognition without any intention for telephoning, and moreover, that continuous calling is undesirably made even when the other party is absent. Meanwhile, if it is certain that the other party answers the telephone, the count starting time of the timer may be set at the time point when the telephone line is closed.

It may also be so arranged that, after giving warning to the operator by the warning section 9 prior to the cutting off of the telephone line 14 as described earlier, the timer 8 is again set so as to provide a sufficient time for the cutting off of the telephone line 14.

In this case, for the releasing of the warning, it is only required to depress the warning releasing switch 12 as described earlier or to utter some voice toward the micro-phone 2.

For the method of warning at the warning section 9, there may be considered various practices employing sound, light or the like, but in the case where the warning is to be released by the input voice as described above, there is a possibility that the warning is released by the warning sound itself.

A first method to avoid the above disadvantage is to interrupt the detection of the voice by the voice detecting circuit 3 during output of the warning sound. This is a method in which the control section 7 instructs the warning section 9 to give warning, while transmitting the voice detecting circuit 3 that the warning sound is being outputted, and the voice detecting circuit 3 regards the voice inputted from the micro-phone 2 as the warning sound, while receiving the signal from the control section 7, without judging said voice as that for releasing the warning. Thus, upon completion of output of the warning sound by the warning section 9, input of the voice for the releasing of the warning becomes possible.

A second method involves a high frequency sound being set as a warning sound. The warning sound which is of the high frequency sound is cut off through a low-pass filter 17 (see FIG. 3) before the voice inputted from the micro-phone 2 is applied to the voice detecting circuit 3 so as to allow only the warning releasing voice to be inputted into the voice detecting circuit 3. In the above second practice, it is possible to release the warning by the voice input from the micro-phone 2 even during the output of the warning sound.

As a third method, there is available such a practice that, with a warning sound being preliminarily accumulated as a reference pattern within the speech recognition section 11, the warning sound is discriminated from the input voice. At the same time as the warning sound is outputted from the warning section 9, the control section 7 transmits to the speech recognition section 11 that the warning sound is being outputted. The speech recognition section 11 analyses the input voice from the micro-phone 2 for the recognition processing, and when the result of recognition of the speech recognition section 11 is judged as a warning sound, the control section 7 nullifies the detection signal of the voice detecting circuit 3 without effecting releasing of the warning. Meanwhile, in the case where the speech recognition section 11 judges the voice inputted through the micro-phone 2 to be that other than the warning sound, the voice detection signal of the voice detecting circuit 3 is regarded as effective to release the warning.

In connection with the above, as a warning by light, there may be considered a practice based on on/off or lighting of a light emitting diode or the like, and by this practice, since no warning sound is outputted, there is no possibility that the warning is undesirably released by the warning sound itself from the micro-phone 2, and when the voice inputted from the micro-phone 2 is detected by the voice detecting circuit 3, the warning can be released by this voice detection signal.

As is clear from the foregoing description, according to the present invention, in the case where the operator forgets to effect the on-hook after completion of the communication, or particularly, where in the speech recognition telephone, the communication is not actually completed as intended or dialing is effected by mistake due to wrong recognition arising from noise input, etc., the telephone set is prevented from being left in the off-hook state.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In telephone equipment provided with voice input means to which the input voice of a user is to be inputted, an automatic on-hook arrangement comprising:
   means for detecting the input voice of the user at said voice input means;
   timer means for measuring time during which said detecting means does not detect the input voice;
   means for emitting a warning for the user when said timer means measures a predetermined period of time during which said detecting means did not detect any input voice from said voice input means;
   means for releasing said warning; and
   means for cutting off a telephone line connection with said voice input means when said warning is not released by said releasing means and not input voice of the user is detected by said detecting means during another predetermined period of time.

2. An automatic on-hook arrangement as in claim 1, further comprising:
   timer setting means for setting time of said timer means.

3. An automatic on-hook arrangement as in claim 2, wherein a count starting time of said timer is at a point in time when the telephone number is sent out to the telephone line.

4. An automatic on-hook arrangement as in claim 2, wherein a count starting time of said timer is at a point in time when the telephone line is closed.

5. An automatic on-hook arrangement as in claim 1, wherein said releasing means includes a switch.

6. A method of obtaining an on-hook arrangement for telephone equipment, comprising the steps of:
   detecting an absence of an input voice of a user at voice input means;
   measuring time during which the input voice of the user is not detected;
   emitting a warning for the user if a predetermined period of time is measured during which the input voice of the user is not detected; and
   cutting off a telephone line connection when the warning is not released and the input voice of the user is not detected for another predetermined period of time.

7. A method as in claim 6, further comprising the step of:
   filtering out the warning with a filter.

8. A method as in claim 6, further comprising:
   releasing the warning and thereby stopping the emitting.

9. A method as in claim 6, wherein the measuring is effected with a timer, and further comprising:
   resetting the timer after the emitting.

10. Telephone equipment comprising: voice input means to which an input voice of a user is to be inputted, a speech recognition means connected to said voice input means for recognizing a voice pattern of the input voice, auto-dial memory means connected to said speech recognition means and which stores a speech recognition pattern, telephone numbers, time set data, and count starting time data, and an automatic on-hook arrangement which comprises:
   means for detecting the input voice of the user at said voice input means;
   timer means for measuring time during which said detecting means does not detect the input voice;
   timer setting means operatively connected between said auto-dial memory means and said timer means for setting time of said timer means, said auto-dial memory means memorizing said setting time as said time set data;
   means for emitting a warning for a user when said timer means measures a predetermined period of time during which said detecting means did not detect any input voice from said voice input means;
   means for releasing said warning; and
   means for cutting off a telephone line connection with said voice input means when said warning is not released by said releasing means and not input voice of the user is detected by said detecting means during another predetermined period of time.

11. In telephone equipment provided with a voice input means to which an input voice of a user is to be inputted, an automatic on-hook arrangement comprising:
   means for detecting the input voice of the user at said voice input means;
   timer means for measuring time during which said detecting means does not detect the input voice;
   means for emitting a warning for the user when said timer means measures a predetermined period of time during which said detecting means did not detect any input voice from said voice input means;
   means for releasing said warning;
   means for cutting off a telephone line connection with said voice input means; and
   control means connected to all of said detecting means, timer means, emitting means, releasing means and cutting off means so that said control means causes said emitting means to emit said warning when said timer means measures said predetermined period of time during which said detecting means did not detect any input voice from said voice input means, said control means causes said emitting means to release said warning if said releasing means is actuated during emission of said warning, and said control means causes said cutting off means to cut off said telephone line connection with said voice input means when said warning is not released by said releasing means and no input voice of the user is detected by said detecting means during another predetermined period of time.

12. An automatic on-hook arrangement as in claim 11, further comprising:
   filter means connected to said voice input means for filtering out said warning if required thereby so that even during emission of said warning, said detecting means only detects the input voice from said voice input means.

13. An automatic on-hook arrangement as in claim 11, wherein said timer means is responsive to said control means to reset after said emitting means emits said warning.

* * * * *